Patented Mar. 1, 1949

2,463,466

UNITED STATES PATENT OFFICE 2,463,466

PRODUCTION OF NITRILES

Milton M. Marisic, Northfield, Ill., and William I. Denton, Woodbury, and Richard B. Bishop, Haddonfield, N. J., assignors to Socony-Vacuum Oil Company, Incorporated, a corporation of New York No Drawing. Application September 29, 1948, Serial No. 51,846

6 Claims. (Cl. 260—465)

This invention relates to a process for producing nitriles containing at least two carbon atoms, and is more particularly concerned with a catalytic process for producing nitriles having at least two carbon atoms, from cycloolefinic hydrocarbons.

Nitriles are organic compounds containing combined nitrogen. Their formula may be represented thus: $R-C \equiv N$, in which R is an alkyl or an aryl group. These compounds are very useful since they can be converted readily to many valuable products such as acids, amines, aldehydes, esters, etc.

As is well known to those familiar with the art, several processes have been proposed for the preparation of nitriles. In general, however, all of these processes have been disadvantageous from one or more standpoints, namely, the relatively high cost of the reactants employed and/or the toxic nature of some of the reactants and/or the number of operations involved in their ultimate preparation. For example, aliphatic nitriles have been synthesized by oxidizing hydrocarbons to acids followed by reacting the acids thus obtained with ammonia in the presence of silica gel. Other methods involve reacting alkyl halides with alkali cyanides, reacting ketones with hydrogen cyanide in the presence of dehydration catalysts, etc. Aromatic nitriles have been synthesized by reacting alkali cyanides with aromatic sulfonates or with aromatic-substituted alkyl halides; by reacting more complex cyanides such as potassium cuprous cyanide, with diazonium halides; by reacting isothiocyanates with copper or with zinc dust; and by reacting aryl aldoximes with acyl halides.

We have now found a process for producing nitriles which is simple and inexpensive, and which employs non-toxic reactants.

We have discovered that nitriles containing at least two carbon atoms, can be prepared by reacting cycloolefinic hydrocarbons with ammonia, at elevated temperatures, in the presence of certain catalysts of the type defined hereinafter.

Our invention is to be distinguished from the conventional processes for the production of hydrogen cyanide wherein carbon compounds, such as carbon monoxide, methane, and benzene are reacted with ammonia at elevated temperatures in the presence of alumina, nickel, quartz, clays, oxides of thorium and cerium, copper, iron oxide, silver, iron, cobalt, chromium, aluminum phosphate, etc. The process of the present invention is also to be distinguished from the processes of the prior art for the production of amines wherein hydrocarbons are reacted with ammonia at high temperatures, or at lower temperatures in the presence of nickel.

Accordingly, it is an object of the present invention to provide a process for the production of nitriles containing at least two carbon atoms. Another object is to afford a catalytic process for the product of nitriles containing at least two carbon atoms. An important object is to provide a process for producing nitriles containing at least two carbon atoms which is inexpensive and commercially feasible. A specific object is to provide a process for producing nitriles containing at least two carbon atoms from cycloolefinic hydrocarbons. Other objects and advantages of the present invention will become apparent to those skilled in the art from the following description.

Broadly stated, our invention provides an inexpensive and commercially feasible process for the production of nitriles containing at least two carbon atoms, which comprises reacting a cycloolefinic hydrocarbon with ammonia, in the gaseous phase and at elevated temperatures, in the presence of catalytic material obtained by decomposing a heteropoly acid or a salt of a heteropoly acid, containing an element selected from the group consisting of molybdenum, tungsten, and vanadium.

Generally speaking, any cycloolefinic hydrocarbon is suitable as the hydrocarbon reactant in the process of our invention. Cyclohexene, 1-methyl cyclohexene-2, 1,3-dimethyl cyclohexene-2, 1,1,3-trimethyl cyclohexene-2, and tetralin may be mentioned by way of non-limiting examples. It will be clear from the discussion of reaction temperatures set forth hereinafter, that many cycloolefinic hydrocarbons are not present per se, when in contact with ammonia and a catalyst of the type used herein, for many of them are cracked to related hydrocarbons under such conditions. Nevertheless, all cycloolefinic hydrocarbons and their hydrocarbon decomposition products which are in the vapor phase under the herein-defined reaction conditions serve the purposes of the present invention. It is to be understood also, that hydrocarbon mixtures containing one or more cycloolefinic hydrocarbons may also be used herein, and that when such mixtures are used, the reaction conditions, such as contact time, will be slightly different in view of the dilution effect of the constituents present with the cycloolefinic hydrocarbon or hydrocarbons. Accordingly, cycloolefinic hydrocarbons, mixtures thereof, and hydrocarbon mixtures containing one or more of such cycloolefinic hydrocarbons may be used.

The proportions of reactants, i. e., cycloolefinic hydrocarbon and ammonia, used in our process may be varied over a wide range with little effect on the conversion per pass and ultimate yield. In general, the charge of reactants may contain as little as 2 mol. per cent or as much as 98 mol. per cent of cycloolefinic hydrocarbons. In practice, however, we use charges containing between about 20 mol. per cent and about 90 mol. per cent of cycloolefinic hydrocarbon, and ordinarily, we prefer to use charges containing a molar excess of ammonia over the cycloolefinic hydrocarbon reactant.

As stated hereinbefore, we have found that the catalysts to be used to produce nitriles containing at least two carbon atoms per molecule, by reacting cycloolefinic hydrocarbons with ammonia, are those obtained by decomposing thermally heteropoly acids and salts of heteropoly acids, containing an element selected from the group consisting of molybdenum, tungsten, and vanadium.

Heteropoly acids are well known in the literature (Modern Aspects of Inorganic Chemistry, H. J. Emeléus and J. S. Anderson; New York; 1940; Chapter V). The heteropoly acids operative in the process of the present invention are those which contain an acid anhydride molecule selected from the group consisting of $MoO_3$, $WO_3$, and $V_2O_5$, and at least one other acid anhydride-type molecule, the latter being regarded as the central group of the acid. These heteropoly acids may also be defined broadly as those acids formed by the union of a radical of molybdic, tungstic or vanadic acids—or two or more of these radicals—with one or more radicals of other fairly strong acids or with amphoteric metal hydroxides. A typical heteropoly acid is phosphomolybdic acid, i. e., $$H_3[PO_4(MoO_3)_{12}] \cdot xH_2O$$

in which $x$ represents the number of molecules of water associated with the crystalline acid and is generally a whole number, five to twenty-nine, wherein the phosphate group ($PO_4$) is the central group. Other representative acids which may be mentioned by way of non-limiting examples, are silicomolybdic acid, i. e., $$H_4[SiO_4(MoO_3)_{12}] \cdot xH_2O$$

and phosphovanadotungstic acid, i. e., $$H_3[PO_4(V_2O_5)_2(WO_3)_8] \cdot xH_2O$$

Salts of the heteropoly acids referred to, which also are well known in the art, are likewise suitable for the preparation of the catalysts of the process of the present invention. Typical salts of the heteropoly acids are ammonium silicomolybdate, i. e., $$(NH_4)_4[SiO_4(MoO_3)_{12}] \cdot xH_2O$$

and nickel silicomolybdate, i. e., $$Ni_2[SiO_4(MoO_3)_{12}] \cdot xH_2O$$

These are mentioned by way of non-limiting examples.

In the interest of brevity, the heteropoly acids and the salts of heteropoly acids contemplated herein as parent materials or intermediates of the catalysts operative in the present process will be referred to hereinafter and in the claims, individually, as a class, and collectively, as heteropoly compounds. The heteropoly compounds may be prepared by any of the methods disclosed in the literature. Advantageously, the components of a heteropoly compound may be composited, blended, or mixed by any suitable means to form an intimate mixture without preparing the heteropoly compound directly, and yet many of the benefits of catalysts prepared from an intermediate heteropoly compound are obtained.

Accordingly, the catalytic materials of the present invention may be obtained by thermally decomposing a heteropoly compound, i. e., a heteropoly acid or a salt of a heteropoly acid, under the hereinafter defined conditions. In general, the temperatures to be used for effecting the thermal decomposition of the heteropoly compounds depend upon the period of time during which a heteropoly compound is subjected to a given temperature. The object of the thermal treatment of the heteropoly compounds is to dehydrate and to decompose them to produce catalytic oxides and yet avoid unnecessary sintering of the resultant catalytic oxides. Sintering detracts from the catalytic activity of the resultant catalytic oxides by reducing the surface area thereof. Accordingly, to obtain the most active catalysts, the thermal treatment of the heteropoly compounds must be carried out at a temperature and for a period of time sufficient to decompose a heteropoly compound, while maintaining sintering of the resultant catalytic oxides to a minimum. In practice, we have found that treatment of the heteropoly compounds at temperatures varying between about 300° F. and about 950° F., for periods of time varying between about two hours and about ten hours, are most convenient from the standpoint of commercial manufacture of the catalysts to be used in the process of this invention. It must be clearly understood, however, that higher or lower temperatures may be used, provided that at higher temperatures, relatively short periods of time are employed so that sintering of the resultant catalytic oxides is kept at a minimum, and that at lower temperatures, relatively longer periods of time are employed to ensure decomposition of the heteropoly compounds.

While the decomposition products of the heteropoly compounds exhibit an appreciable degree of catalytic effectiveness when used per se, they generally possess additional activity when used in conjunction with the well known catalyst supports, such as activated alumina, bauxite, silica gel, Carborundum, pumice, clays, and the like. We especially prefer to use activated alumina ($Al_2O_3$) as a catalyst support. Without any intent of limiting the scope of the present invention, it is suspected that the enhanced catalytic activity of the supported catalysts is attributable primary to their relatively large surface area.

The concentration of catalytic heteropoly compound in the supported catalysts influences the conversion per pass. In general, the conversion per pass increases with increase in the concentration of heteropoly compound. For example, we have found that a catalyst comprising initially 20 parts by weight of phosphomolybdic acid on 80 parts by weight of activated alumina is more effective than one comprising initially 10 parts by weight of phosphomolybdic acid on 90 parts by weight of activated alumina. It is to be understood, however, that supported catalysts containing larger or smaller amounts of catalytic heteropoly compound may be used in our process.

The catalysts of the present invention possess several advantages. In addition to providing relatively high conversions of cycloolefinic hydrocarbons into nitriles containing at least two carbon atoms per molecule, they are readily regenerated without loss thereof. In operation, the catalysts become fouled with carbonaceous material which ultimately affects their catalytic activity. Accordingly, when the efficiency of the catalyst declines to a point where further operation becomes uneconomical or disadvantageous from a practical standpoint, the catalyst may be regenerated as is well known in the art, by subjecting the same to a careful oxidation treatment, for example, by passing a stream of air or air diluted with flue gases over the catalyst under appropriate temperature conditions and for a suitable period of time, such as the same period of time as the catalytic operation. Preferably, the oxidation treatment is followed by a purging treatment, such as passing over the catalyst a stream of purge gas, for example, nitrogen, carbon dioxide, steam, etc.

The lower oxides of the aforesaid heteropoly compounds, obtained by decomposing thermally the latter, are not volatile under conditions generally employed in oxidative catalyst regeneration. Therefore, it will be apparent that these catalysts will have a long useful life. The volatility of the catalysts used herein can be correlated with their color. Thus, phosphomolybdic acid (or ammonium phosphomolybdate) on decomposition yields a product which is dark blue in color and non-volatile; whereas arsenomolybdic acid decomposed to a product which is faint blue in color and which is slightly volatile at elevated temperatures in a current of air. Decomposition of silico-molybdic acid results in a product which is intermediate in color and volatility to those of the catalytic products obtained from phosphomolybdic acid and arsenomolybdic acid.

Illustrative of the catalysts contemplated for use in the process of the present invention are the following:

EXAMPLE 1

*Decomposition product of phosphomolybdic acid on activated alumina*

Two hundred (200) c. c. of 36% hydrochloric acid were added to 600 c. c. of a solution containing 400 grams of sodium molybdate,

$Na_2MoO_4 \cdot 2H_2O$ with constant stirring. The resulting solution was maintained at a temperature of 170° F. and 400 c. c. of a solution containing 98.6 grams of sodium monohydrogen phosphate,

$Na_2HPO_4 \cdot 12H_2O$ were added thereto, followed by 422 c. c. of 38% hydrochloric acid, the latter being added dropwise while the solution was constantly stirred. The yellow colored solution thus formed was cooled to room temperature (about 70–75° F.) and extracted with diethyl ether. The etherphosphomolybdic acid complex so formed was then diluted with distilled water and poured onto 500 c. c. of activated alumina (8–14 mesh granules). Ether and water were removed by evaporation and the impregnated alumina thus formed was gradually heated to a temperature of 840° F. and maintained at that temperature for two hours. The catalytic material thus obtained was dark blue in color and comprised oxides of molybdenum and phosphorus on alumina.

EXAMPLE 2

*Decomposition product of ammonium phosphovanadotungstate on activated alumina*

Two hundred (200) grams of ammonium tungstate, $(NH_4)_2WO_4$, 43.4 grams of ammonium metavanadate, $NH_4VO_3$, 8.6 grams of ammonium monohydrogen phosphate, $(NH_4)_2HPO_4$, and 140 c. c. of 36% aqueous ammonia were added to 3 liters of distilled water. The mixture was stirred and heated to a temperature of about 200° F. until solution of the salts was complete. The volume was kept constant by occasionally adding distilled water. A deep red solution was obtained. The solution was evaporated to about 500 c. c. and then was poured onto 500 c. c. of activated alumina (8–14 mesh granules). Water was removed by evaporation and the impregnated alumina thus obtained was gradually heated to a temperature of 840° F. and maintained at that temperature for two hours. The catalytic material thus formed was reddish brown in color and comprised oxides of vanadium, tungsten and phosphorus on alumina. It may be considered as derived from phosphovanadotungstic acid.

EXAMPLE 3

*Decomposition product of silicomolybdic acid on activated alumina*

This catalytic material was prepared in the same manner as the catalyst of Example 1, with the exception that the sodium monohydrogen phosphate was replaced by sodium silicate. The catalyst thus obtained was pale blue in color and comprised the oxides of molybdenum and silica on alumina.

The reaction or contact time, i. e., the period of time during which a unit volume of the reactants is in contact with a unit volume of catalyst, may vary between a fraction of a second and several minutes. Thus, the contact time may be as low as 0.01 second and as high as 20 minutes. We prefer to use contact times varying between about 0.1 second and one minute, particularly, between 0.3 second and 30 seconds. It must be realized that these figures are at best estimates based on a number of assumptions. For all practical purposes, as in catalytic processes of the type of the present invention, the more reliable data on contact time is best expressed, as is well known in the art, in terms of liquid space velocities, in the present instance, the volume of liquid cycloolefinic hydrocarbon reactant per volume of catalyst per hour. For example, at atmospheric pressure, we have found that the space velocities may be varied considerably and that velocities varying between about one-fourth to about 4 are quite satisfactory for the purpose of the present invention.

In general, the temperatures to be used in our process vary between about 850° F. and up to the decomposition temperature of ammonia (about 1250–1300° F.), and preferably, between about 925° F. and about 1075° F. The preferred temperature to be used in any particular operation will depend upon the nature of the cycloolefinic hydrocarbon reactant employed. Generally speaking, the higher temperatures increase the conversion per pass, but they also increase the decomposition of the reactants, thereby decreasing the ultimate yields of nitriles. Accordingly, the criteria for determining the optimum temperature to be used in any particular operation will be based on the nature of the cycloolefinic hydrocarbon reactant and a consideration of commercial feasibility from the standpoint of striking a practical balance between conversion per pass and losses to decomposition.

The process of the present invention may be carried out at subatmospheric, atmospheric or superatmospheric pressures. Superatmospheric pressures are advantageous in that the unreacted charge materials condense more readily. Subatmospheric pressures appear to favor the reactions involved since the reaction products have a larger volume than the reactants, and hence, it is evident from the law of Le Chatelier-Braun that the equilibrium favors nitrile formation more at reduced pressures. However, such pressures reduce the throughput of the reactants and present increased difficulties in recycling unreacted charge materials. Therefore, atmospheric pressure or superatmospheric pressures are preferred.

At the present time, the reaction mechanism involved in the process of the present invention is not fully understood. Fundamentally, the simplest possible method of making nitriles is to introduce nitrogen directly into a hydrocarbon molecule, thereby avoiding intermediate steps with their accompanying increased cost. In our process, we have noted that considerable amounts of hydrogen are evolved and that aliphatic nitriles as well as aromatic nitriles are formed. Hence, it is postulated, without any intent of limiting the scope of the present invention, that in our process, the aliphatic nitriles are formed by an initial ring opening followed by replacement of hydrogen with nitrogen, while the aromatic nitriles are formed by the dehydrogenation of an alkyl-substituted cycloolefinic hydrocarbon having the same structural configuration as that of an aromatic hydrocarbon, to an alkyl-substituted aromatic hydrocarbon followed by or concurrent with the replacement of hydrogen in the alkyl substituent with nitrogen.

The present process may be carried out by making use of any of the well-known techniques for operating catalytic reactions in the vapor phase effectively. By way of illustration, methyl cyclohexene and ammonia may be brought together in suitable proportions and the mixture vaporized in a preheating zone. The vaporized mixture is then introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in a reaction chamber, the catalyst will be thereafter suitably separated from the reaction mixture by filtration, etc. The reaction mixture will be predominantly a mixture of nitriles, hydrogen, toluene, unchanged methyl cyclohexene, and unchanged ammonia. The nitriles, the unchanged methyl cyclohexene and toluene will be condensed in passing through the condensing zone and will be retained in the receiving chamber. The nitriles can be separated from the unchanged methyl cyclohexene and toluene by any of the numerous and well known separation procedures, such as fractional distillation. Similarly, the uncondensed hydrogen and unchanged ammonia can be separated from each other. The unchanged methyl cyclohexene and ammonia, and toluene, if desired, can be recycled, with or without fresh methyl cyclohexene and ammonia, to the process.

It will be apparent that the process may be operated as a batch or discontinuous process as by using a catalyst-bed-type reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when we use one or more catalyst chambers through which the catalyst flows in contact with the reactants. In such a continuous process, the catalyst will flow through the reaction zone in contact with the reactants and will thereafter be separated from the reaction mixture as, for example, by accumulating the catalyst on a suitable filter medium, before condensing the reaction mixture. In a continuous process, therefore, the catalyst—fresh or regenerated—and the reactants—fresh or recycle—will continuously flow through a reaction chamber.

The following detailed example is for the purpose of illustrating a mode of preparing nitriles in accordance with the process of our invention, it being clearly understood that the invention is not to be considered as limited to the specific cycloolefinic hydrocarbon reactant or to the specific catalyst disclosed therein or to the manipulations and conditions set forth in the examples. As it will be apparent to those skilled in the art, a wide variety of other cycloolefinic hydrocarbons and of other catalysts of the type described hereinbefore may be used.

A reactor consisting of a shell containing a catalyst chamber heated by circulating a heat-transfer medium thereover, and containing 100 parts by weight of a catalyst formed in accordance with Example 1 was used. The catalyst was condensed by passing a steam of ammonia thereover for 45 minutes at 900° F. Ammonia and methyl cyclohexene, in a molar ratio of 2:1, respectively, were introduced in vapor phase into the reactor at a temperature of 1000° F. and at a rate to give a contact time of 2.8 seconds. The pressure in the reactor was atmospheric. The reaction mixture was passed from the reactor, through a condenser, into a first receiving chamber. Hydrogen and unchanged ammonia were collected in a second receiving chamber and then separated from each other. The nitriles and the unchanged methyl cyclohexene (some of the latter was converted into toluene) remained in the first receiving chamber and were subsequently separated by distillation. About 2.5% by weight per pass of the methyl cyclohexene was converted into benzonitrile, while about 2.5% by weight per pass of the methyl cyclohexene was converted into acetonitrile.

It will be apparent that the present invention provides an efficient, inexpensive and safe process for obtaining nitriles. Our process is of considerable value in making available relatively inexpensive nitriles which are useful, for example, as intermediates in organic synthesis.

This application is a continuation-in-part of copending application, Serial Number 706,517, filed October 29, 1946, now abandoned, which in turn is a continuation-in-part of application, Serial Number 539,034, filed June 6, 1944, now abandoned.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

We claim:

1. The process for manufacturing nitriles having at least two carbon atoms, which comprises contacting a cycloolefinic hydrocarbon selected from the group consisting of methyl cyclohexenes, dimethyl cyclohexenes, and trimethyl cyclohexenes, with ammonia, in vapor phase, at temperatures varying between about 925° F. and about 1075° F., in the presence of catalytic oxides obtained by treating a heteropoly compound containing an acid anhydride molecule selected from the group consisting of $MoO_3$, $WO_3$, and $V_2O_5$, at a temperature and for a period of time sufficient to decompose said heteropoly compound.

2. The process for manufacturing nitriles having at least two carbon atoms, which comprises contacting a cycloolefinic hydrocarbon selected from the group consisting of methyl cyclohexenes, dimethyl cyclohexenes, and trimethyl cyclohexenes, with ammonia, in vapor phase, at temperatures varying between about 925° F. and about 1075° F., in the presence of catalytic oxides obtained by treating a heteropoly compound containing an acid anhydride molecule selected from the group consisting of $MoO_3$, $WO_3$, and $V_2O_5$, at a temperature and for a period of time sufficient to decompose said heteropoly compound, supported on a catalyst support.

3. The process for manufacturing nitriles having at least two carbon atoms, which comprises contacting a cycloolefinic hydrocarbon selected from the group consisting of methyl cyclohexenes, dimethyl cyclohexenes, and trimethyl cyclohexenes, with ammonia, in vapor phase, at temperatures varying between about 925° F. and about 1075° F., in the presence of catalytic oxides obtained by treating a heteropoly compound containing an acid anhydride molecule selected from the group consisting of $MoO_3$, $WO_3$, and $V_2O_5$, at a temperature falling within the range varying between about 300° F. and about 950° F., and for a period of time falling within the range varying between about two hours and ten hours, supported on alumina.

4. The process for manufacturing nitriles having at least two carbon atoms, which comprises contacting methyl cyclohexene with ammonia, in vapor phase, at temperatures varying between about 925° F. and about 1075° F., in the presence of catalytic oxides obtained by treating a heteropoly compound containing the acid anhydride molecule $MoO_3$, at a temperature and for a period of time sufficient to decompose said heteropoly compound.

5. The process for manufacturing nitriles having at least two carbon atoms, which comprises contacting methyl cyclohexene with ammonia, in vapor phase, at temperatures varying between about 925° F. and about 1075° F., in the presence of catalytic oxides obtained by treating a heteropoly compound containing the acid anhydride molecule $MoO_3$, at a temperature and for a period of time sufficient to decompose said heteropoly compound, supported on a catalyst support.

6. The process for manufacturing nitriles having at least two carbon atoms, which comprises contacting methyl cyclohexene with ammonia, in vapor phase, at temperatures varying between about 925° F. and about 1075° F., in the presence of catalytic oxides obtained by treating a heteropoly compound containing the acid anhydride molecule $MoO_3$, at a temperature falling within the range varying between about 300° F. and about 950° F., and for a period of time falling within the range varying between about two hours and ten hours, supported on alumina.

MILTON M. MARISIC.
WILLIAM I. DENTON.
RICHARD B. BISHOP.

No references cited.